US 6,496,283 B1

(12) United States Patent
Kabeya

(10) Patent No.: US 6,496,283 B1
(45) Date of Patent: Dec. 17, 2002

(54) COMMUNICATION DEVICE

(75) Inventor: Shozo Kabeya, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/277,846

(22) Filed: Mar. 29, 1999

(30) Foreign Application Priority Data

Mar. 30, 1998 (JP) ............................................ 10-104154

(51) Int. Cl.[7] .............................. H04N 1/32; H04M 3/42
(52) U.S. Cl. .................. 358/468; 358/400; 379/201.01; 379/215.01
(58) Field of Search ............................... 358/400, 468, 358/434, 442; 379/201.01, 215.01

(56) References Cited

U.S. PATENT DOCUMENTS 5,546,451 A * 8/1996 Shen .......................... 358/434
5,581,369 A * 12/1996 Righter et al. ............... 358/442
5,903,643 A * 5/1999 Bruhnke ................. 379/201.01

FOREIGN PATENT DOCUMENTS

| GB | 2303272 | * | 2/1997 | ............ H04M/3/42 |
| JP | 63-142755 | * | 6/1988 | ............ H04M/3/42 |
| JP | 03-157043 | * | 7/1991 | ............ H04M/3/42 |
| JP | 04-007945 | * | 3/1992 | ............ H04M/3/42 |
| JP | 07-177330 | * | 7/1995 | ............ H04N/1/32 |

OTHER PUBLICATIONS

"Cancel Call Waiting: FSD 01–02–1204," Bellcore—Bell Communications Research, Issue 1, Jul. 1989.

* cited by examiner

Primary Examiner—Kimberly A. Williams
(74) Attorney, Agent, or Firm—Oliff & Berridge, PLC

(57) ABSTRACT

In S10, a CPU detects whether the transmission start button 3a has been turned ON to request an automatic facsimile transmission. If so, then the telephone circuit is closed, and a dial tone is transmitted from an exchange system. After waiting three seconds after the dial tone has been received, then in S16, the CPU automatically retrieves an access code from a RAM and dials the access code. Upon receipt of the dial signal, the exchange system will set an interrupt prohibition, which will prohibit interruption during the communication just to be performed. Next in S20, the CPU retrieves a remote facsimile number from the RAM and dials the remote facsimile number. Once the line is connected with the remote facsimile machine, image information is transmitted from the facsimile machine to the remote facsimile machine in S22.

13 Claims, 5 Drawing Sheets

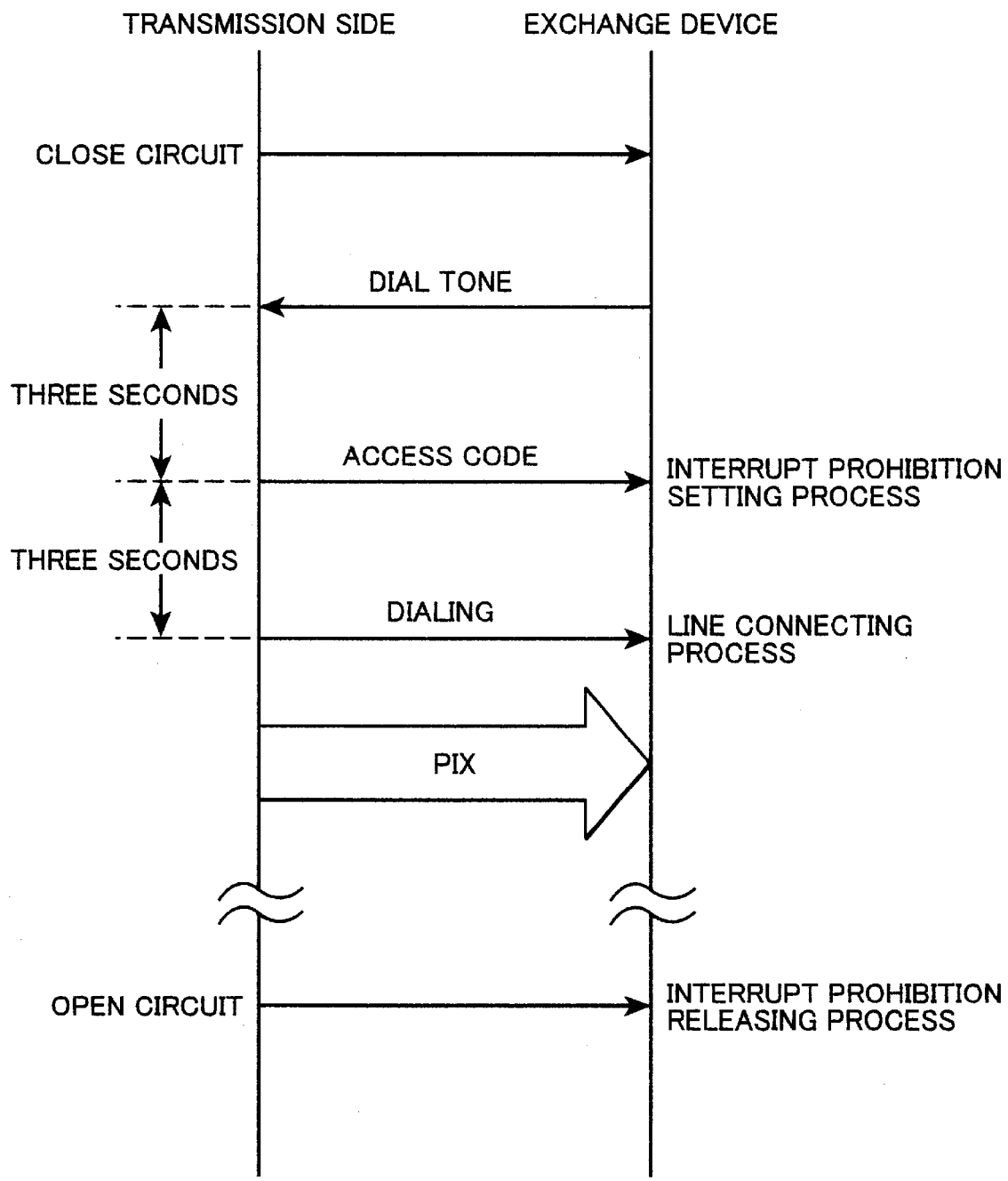

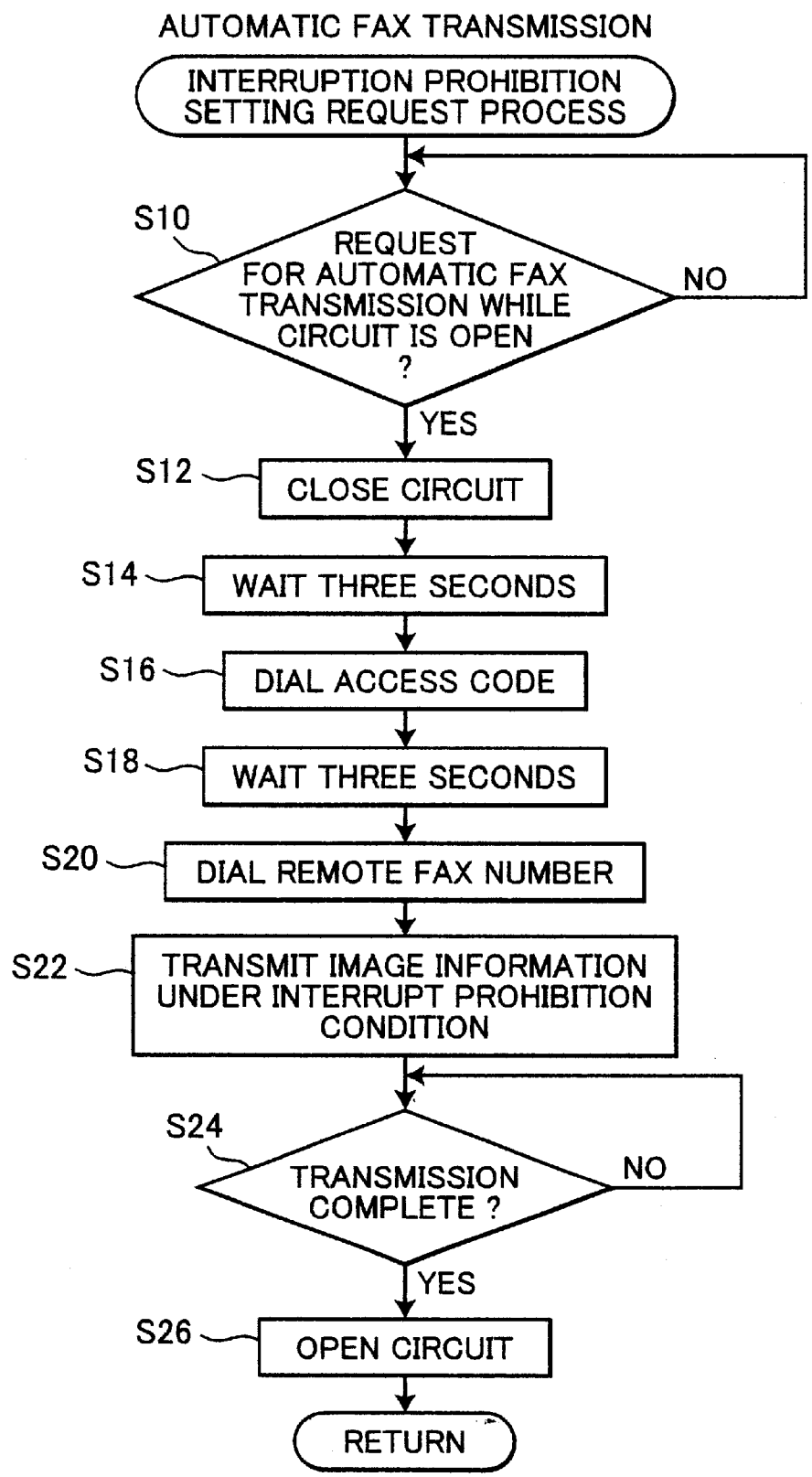

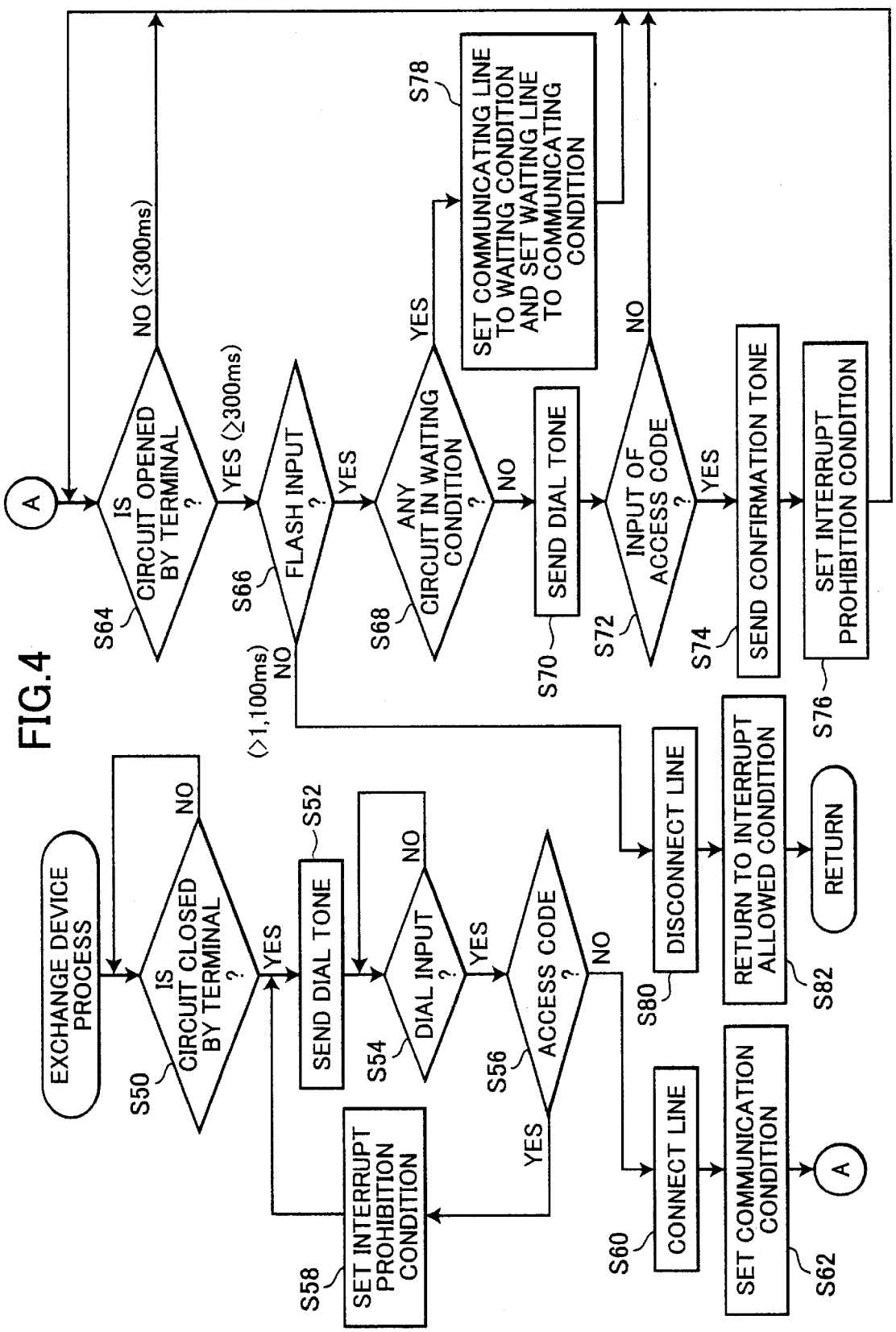

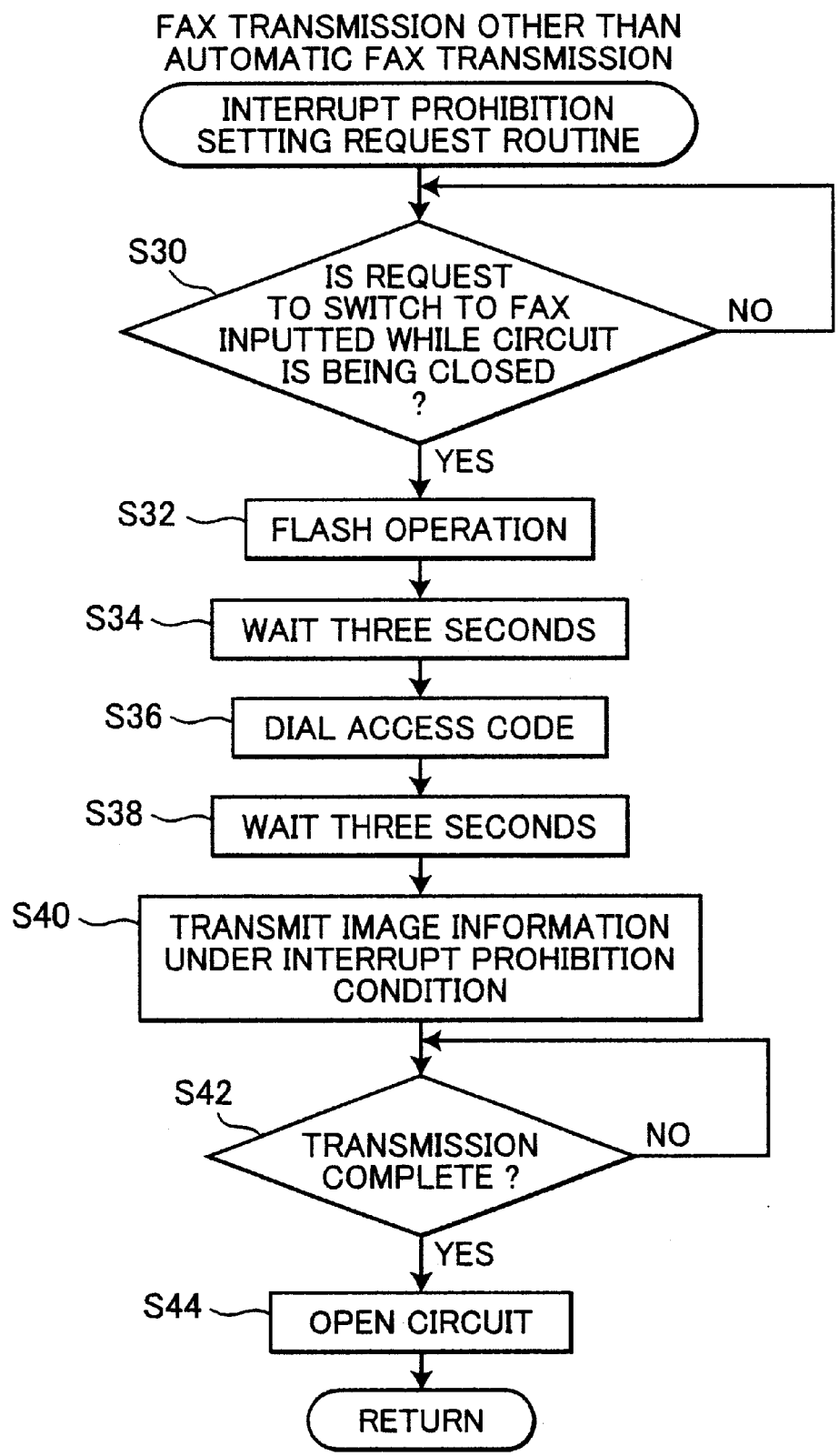

COMMUNICATION DEVICE

BACKGROUND OF THE INVENTION

1. Field of the Invention

The present invention relates to a communication device such as a facsimile machine that can perform its communication with a remote communication device without being interrupted by any other accesses incoming from a circuit network.

2. Description of Related Art

There has been proposed a call waiting service. During a call between a subscriber of the call waiting service and a remote party, when a new calling party calls the call-waiting service subscriber, the present call is interrupted by the new call so that the call-waiting service subscriber can have a conversation with the new calling party.

There have been proposed two conventional methods for disabling this call waiting feature during a desired telephone call so that the desired call will not be interrupted by any other calls incoming from the circuit network.

In the first method, when the user places a telephone call, he/she dials a predetermined access code while placing his/her communication device into an off hook condition. This will disable the call waiting feature so that the telephone call will not be interrupted by any other calls from the circuit network. After the telephone call is completed and the user returns the communication device to an on hook condition, the call waiting features are automatically restored so that telephone communications to be conducted thereafter will be interrupted by other calls incoming from the circuit network.

The second method is similar to the first method. In the second method, the user dials the access code during a telephone call rather than when making the telephone call. In the second method, the user places the communication device in an off hook condition for a predetermined short period of time while the user performs his/her telephone communication with the remote device. Then, the user dials the predetermined access code to disable the call waiting feature so that the present telephone commination will not be interrupted by other calls from the communication network. As in the first method, when the present communication is completed and the communication device is again placed in an on hook condition, call waiting features are automatically restored so that telephone communication to be conducted thereafter will be interrupted by any other calls incoming from the circuit network.

SUMMARY OF THE INVENTION

When a transmission line, connected to a telephone of the call waiting service subscriber, is also connected to a facsimile machine, the single transmission line is shared by the telephone and the facsimile machine. Accordingly, facsimile communication will also be interrupted by other incoming calls from the circuit network. When the facsimile communication is interrupted by an incoming call, however, noise will possibly generate and will distort image information that is being transmitted or being received.

In order to solve this problem, the facsimile machine can be controlled in the above-described two methods before the facsimile machine starts facsimile communication procedure so that the facsimile communication will not be interrupted by any calls incoming from the circuit network.

Using either of the above-described two methods, however, requires a troublesome operation for manually dialing the access code.

It is therefore an objective of the present invention to provide an improved communication device that can be set into an interrupt prohibition condition, without requiring any troublesome manual operations, so that the communication device can reliably perform communication with remote communication devices without being interrupted by any other calls from the circuit network.

In order to attain the above and other objects, the present invention provides a communication device, comprising: communication means for executing communication with a remote communication device via a communication network; storing means for storing instruction data for instructing setting of prohibition of interruption from the communication network while communication is being established by the communication means with the remote communication device; and instruction transmission means for retrieving the instruction data from the storing means and for transmitting the instruction data to the communication network.

The communication means may start communicating with the remote communication device after the instruction transmission means retrieves the instruction data from the storing means and transmits the instruction data to the communication network.

The communication means may transmit, through a closed communication circuit connected to the remote communication device, a signal for setting a condition capable of setting the interruption prohibition, before the instruction transmission means retrieves the instruction data from the storing means and transmits the instruction data to the communication network.

The communication means may execute communication with the remote communication device via a predetermined exchange device, wherein the storing means stores instruction data for instructing the exchange device to set prohibition of interruption by other communications while communication is being established by the communication means with the remote communication device via the predetermined exchange device, and wherein the instruction transmission means retrieves the instruction data from the storing means and transmits the instruction data to the predetermined exchange device.

According to another aspect, the present invention provides a communication device, comprising: a communication unit executing communication with a remote communication device via a communication network; a storage unit storing instruction data for instructing setting of prohibition of interruption from the communication network while communication is being established by the communication means with the remote communication device; and an instruction transmission unit retrieving the instruction data from the storing means and transmitting the instruction data to the communication network.

According to still another aspect, the present invention provides a data storage medium storing a data of a program for controlling a communication device that has a storing portion for storing therein instruction data for instructing setting of prohibition of interruption from a communication network while communication is being established with a remote communication device, the program comprising: a program of retrieving the instruction data from the storing portion and for transmitting the instruction data to a communication network; and a program of executing communication with a remote communication device via the communication network.

BRIEF DESCRIPTION OF THE DRAWINGS

The above and other objects, features and advantages of the invention will become more apparent from reading the following description of the preferred embodiment taken in connection with the accompanying drawings in which:

FIG. 2 is an explanatory view showing transmission procedures performed between the facsimile machine of the first embodiment of the present invention and an exchange system;

FIG. 3 is a flowchart representing a routine executed by a CPU 40 in the facsimile machine for setting an interrupt prohibition before automatically transmitting image information to a remote communication device;

FIG. 4 is a flowchart representing a routine executed by the exchange system in response to the routine of FIG. 3 executed by the facsimile machine; and FIG. 5 is a flowchart representing a routine executed by the CPU in the facsimile machine according to a second embodiment.

DETAILED DESCRIPTION OF THE PREFERRED EMBODIMENTS

Figure 1:
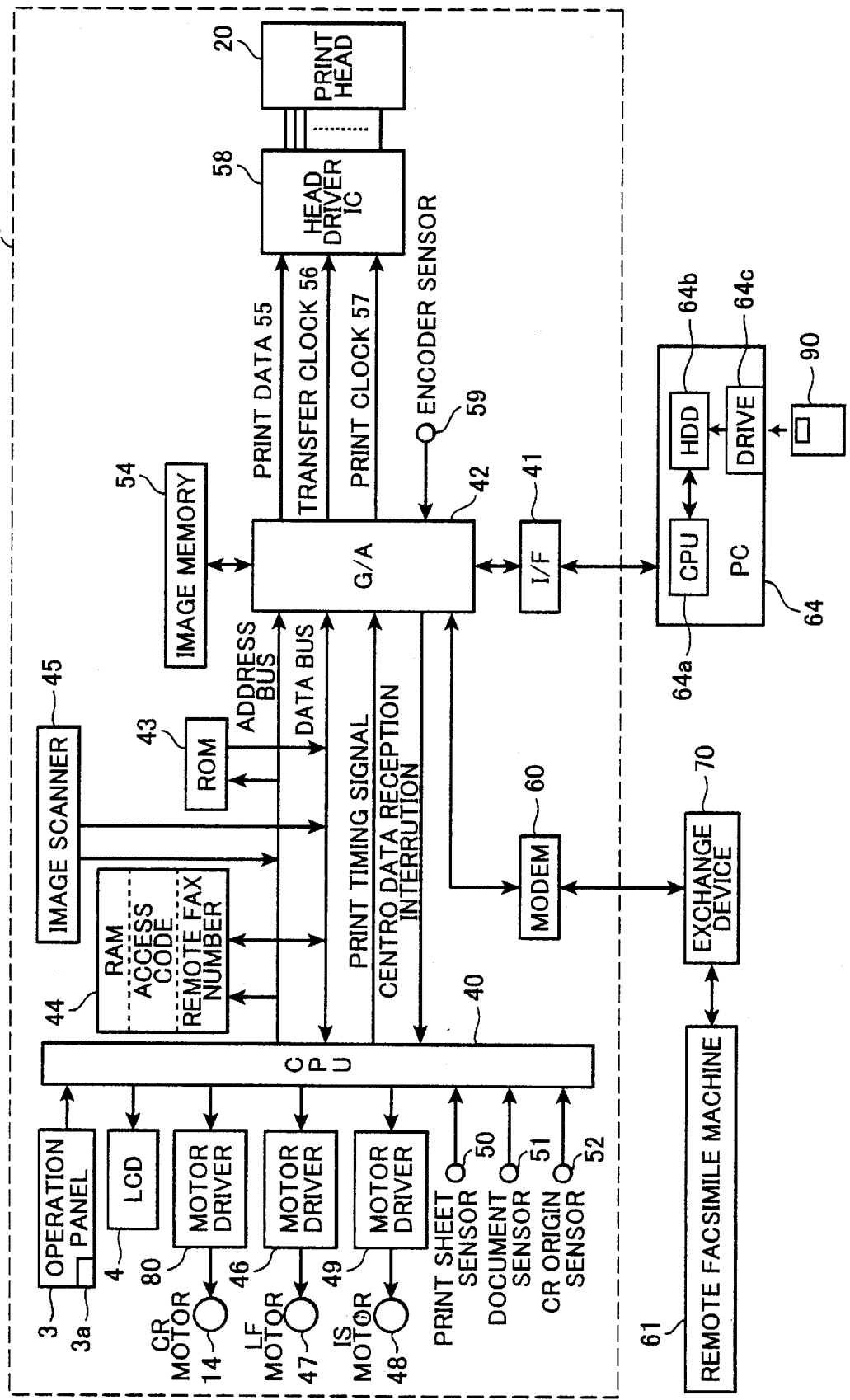
FIG. 1 is a block diagram of a main control system of a facsimile machine of a first embodiment of the present invention.

A communication device according to preferred embodiments of the present invention will be described while referring to the accompanying drawings wherein like parts and components are designated by the same reference numerals to avoid duplicating description.

First Embodiment

A communication device of a first embodiment of the present invention will be described below with reference to FIGS. 1–4.

The communication device 1 of the present embodiment is a facsimile machine.

As shown in FIG. 1, the facsimile machine 1 is connected via a telephone circuit to an exchange device or switchboard 70. Many remote devices can be connected to the exchange device 70 via a telephone circuit. FIG. 1 shows, as an example of the remote devices, a remote facsimile machine 61 that can be connected to the exchange device 70 via a telephone circuit. Although not shown in the drawings, many remote devices can be connected to the exchange device 70 via various types of circuit network.

The facsimile machine 1 is also connected to a personal computer 64 via an interface (I/F) 41. The facsimile machine 1 can receive, from the personal computer 64, print data desired to be printed by the facsimile machine 1.

As shown in FIG. 1, the facsimile device 1 includes: a recording head 20, an image scanner 45, a communication modem 60, and a gate array 42. The recording head 20 is for recording incoming facsimile data received from the telephone circuit and print data inputted from the personal computer 64. The image scanner 45 is for scanning a document mounted thereon to produce outgoing facsimile data. The communication modem 60 is for modulating the outgoing facsimile data and transmitting the modulated data to the telephone circuit and for receiving incoming facsimile data from the telephone circuit and demodulating the received data. The gate array 42 is for developing incoming facsimile data received and demodulated by the communication modem 60 and for developing print data inputted from the personal computer 64 via the interface 41.

The facsimile machine 1 includes a CPU 40 for controlling the entire facsimile machine 1 by performing a variety of different controls, such as a transmission control for controlling the modem 60 to transmit outgoing facsimile data, a reception control for controlling the modem 60 to receive incoming facsimile data, a retrieval control for retrieving image information from a document using the image scanner 45, a recording control for recording incoming facsimile data and print data onto a recording sheet using the recording head 20, an input/output control for inputting and outputting data from and to the personal computer 64, and an automatic facsimile transmission control of the present embodiment for instructing the exchange system 70 to set a predetermined interrupt prohibition condition during the automatic facsimile transmission processes.

The CPU 40 and the gate array 42 are connected by an address bus and a data bus. A ROM 43 and a RAM 44 are connected to the address bus and the data bus. The ROM 43 stores therein control programs to be executed by the CPU 40 to perform the above-described variety of controls. For example, the ROM 43 stores therein an automatic facsimile transmission process whose flowchart is shown in FIG. 3. In order to allow the CPU 40 to execute the various control programs, the control programs are first retrieved from the ROM 43 and are temporarily stored in the RAM 44. The CPU 40 also performs input/output operation for inputting/outputting necessary data between the ROM 43 and the RAM 44.

The RAM 44 previously stores therein data of a predetermined access code for requesting the switchboard 70 to set the predetermined interrupt prohibition condition. The RAM 44 further serves to temporarily store a facsimile number of a remote facsimile machine, to which the user of the facsimile machine 1 desires to transmit image information.

The gate array 42 is connected to an image memory 54 and an encoder sensor 59. The image memory 54 is for temporarily storing, as image data 55, a variety of received data (incoming facsimile data and print data supplied from the personal computer 64). The encoder sensor 59 is for measuring a moving speed of a carriage (not shown), on which the recording head 20 is mounted, and for determining recording timing. The gate array 42 generates a recording clock 57 based on a signal outputted from the encoder sensor 59 in association with the movement of the carriage. The gate array 42 also generates a transfer clock 56. A head driver IC 58 is connected to the gate array 42, and receives image data 55, a recording clock 57, and a transfer clock 56 from the gate array 42. The head driver IC 58 drives the recording head 20 based on the received image data 55, recording clock 57, and transfer clock 56.

The CPU 40 is connected with: a recording sheet sensor 50; a document sensor 51; a carriage origin sensor 52; a first motor driver 80 for driving a carriage motor 14 to move the carriage; a second motor driver 46 for driving a line feed motor 47 for rotating a platen roller (not shown) to feed a recording sheet; a third motor driver 49 for driving an image scanner motor 48 of the image scanner 45; an operation panel 3; and a liquid crystal display device 4.

The recording sheet sensor 50 is for detecting presence or absence of a recording sheet. The document sensor 51 is for detecting whether a document is set in an image retrieval portion of the image scanner 45. The carriage origin sensor 52 is for detecting whether the carriage is in its home position. The operation panel 3 is for enabling a user to input a variety of input signal into the CPU 40. For example, the operation panel 3 is provided with several speed dial buttons, a numeric pad, and a transmission start button 3a.

Although not shown in the drawing, the facsimile machine 1 is further provided with a telephone unit that is comprised from a hook button and a handset for making a telephone call with a remote device 61, for example.

The exchange system 70, connected to the facsimile machine 1, is generally set to a predetermined interrupt condition with regards to the facsimile machine 1. That is, while a communication is established between the facsimile machine 1 and a remote party, when another remote party calls the facsimile machine 1 from the circuit network, the exchange system 70 performs a switching operation to switch the present communicating line into a waiting line and then to connect the line from the facsimile machine 1 with the line from the new calling party. Thus, the exchange system 70 interrupts the already-established communication by a new call from the circuit network.

According to the present embodiment, when the facsimile machine 1 is to be used for transmitting a facsimile message to a remote party, the facsimile machine 1 automatically requests the exchange system 70 to set the interrupt prohibition condition. When the exchange system 70 is set in the interrupt prohibition condition, even when a new call comes during a communication between the present facsimile machine 1 and a remote party, the exchange system 70 will not perform the switching operation to connect the line from the facsimile machine 1 to the line from the new calling party.

More specifically, before transmitting a facsimile message to a remote party, the facsimile machine 1 requests the exchange device 70 as shown in FIG. 2 so that the interrupt prohibition be set during the facsimile transmission procedure. That is, the CPU 40 in the facsimile machine 1 performs the automatic facsimile transmission process of FIG. 3 to request setting of the interrupt prohibition and then to transmit image information to the remote party. In correspondence with the automatic facsimile transmission process executed by the facsimile machine 1, the exchange system 70 performs the process of FIG. 4 to set the interrupt prohibition before a facsimile transmission procedure is started and then to release the interrupt prohibition after the facsimile transmission procedure is ended.

The operation of the facsimile machine 1 and the operation of the switchboard 70 will be described below in greater detail with reference to FIGS. 3 and 4.

When a user of the facsimile machine 1 desires to control the facsimile machine 1 to perform automatic facsimile transmission operation, the user first sets, on the facsimile machine 1, a document to be transmitted by facsimile transmission. The user then inputs a facsimile number of a remote facsimile machine 61, to which the image information is desired to be transmitted. The user inputs the facsimile number of the remote facsimile machine 61 using either the speed dial button or the numeric pad provided to the operation panel 3. The thus inputted facsimile number is temporally stored in the RAM 44.

The user then turns ON the transmission start button 3a which is also provided to the operation panel 3. Thus, the user inputs, while the telephone circuit is still open, his/her request to automatically transmit a facsimile message. When the CPU 40 detects input of this request (S10:YES), the CPU 40 closes the telephone circuit in S12.

When the exchange system 70 detects that the telephone circuit is closed by the facsimile machine 1 (S50:YES), then in S52, the exchange system 70 transmits a dial tone to the facsimile machine 1 to indicate that the line has been successfully closed.

In S14, the CPU 40 waits three seconds after receiving the dial tone. Then in S16, the CPU 40 automatically retrieves the access code from the RAM 44, and dials the access code.

When the exchange system 70 detects input of a dial signal which is transmitted from the facsimile machine 1 according to its dialing operation (S54:YES), then in S56, the exchange system 70 judges whether or not the inputted dial signal indicates the predetermined access code. That is to say, in S56, the exchange system 70 judges whether the inputted dial signal indicates a normally-dialed telephone number or instructs setting of the interrupt prohibition condition.

When the exchange system 70 judges that the inputted dial signal indicates the predetermined access code (S56:YES), then in S58, the exchange system 70 sets the interrupt prohibition condition for the present facsimile machine 1 wherein interruption over the circuit network will be prohibited. Next, the program returns to S52 where the exchange system 70 transmits, to the facsimile machine 1, another dial tone indicating that the interrupt prohibition condition has been properly set.

After receiving the dial tone, the CPU 40 of the facsimile machine 1 waits three seconds in S18. Then, in S20, the CPU 40 retrieves the facsimile number of the remote facsimile machine 61 from the RAM 44, and dials the facsimile number.

When the exchange system 70 detects input of the dial signal that is transmitted from the facsimile machine 1 according to its dial operations (S54:YES,) then in S56, the exchange system 70 again judges whether or not the inputted dial signal indicates the access code. In this case, the inputted dial signal indicates a facsimile number (S56:NO), so the program precedes to S60, whereupon the exchange system 70 executes processes to connect the telephone line from the facsimile device 1 with the line from the remote facsimile machine 61. Thus, the exchange system 70 sets a predetermined communication condition in S62.

During the communication condition, the exchange system 70 will continue monitoring the state of the telephone circuit (no in S64) until the telephone circuit will be opened by either the facsimile machine 1 or 61 for a period of time equal to or longer than a predetermined period of time, 300 ms, for example.

In the present facsimile machine 1, the CPU 40 instructs the image scanner 45 to retrieve image information recorded on the document, and transmits the retrieved image information (PIX in FIG. 2) to the remote facsimile machine 61 over the exchange system 70 in S22.

It is noted that the exchange system 70 is now being in the interrupt prohibition condition. Accordingly, even when a new calling party calls the present facsimile machine 1 while the present facsimile communication is being executed, the exchange system 70 will not perform any switching operation to connect the line from the facsimile machine 1 with the line from the new calling party. Thus, the facsimile communication between the facsimile machines 1 and 61 is not interrupted by any calls incoming from the circuit network.

When the CPU 40 detects that the transmission of image information has been completed (S24:YES), then in S26, the CPU 40 opens the telephone circuit to terminate the transmission. In this case, the telephone circuit is opened longer than the predetermined time period (300 ms in this example), and therefore the exchange system 70 detects that the circuit is opened (S64:YES). As a result, the program proceeds to S66, in which the exchange system 70 further detects whether or not the opening of the circuit indicates a predetermined flashing operation. More specifically, the exchange system 70 judges in S66 whether or not the telephone circuit is opened for a period of time within a predetermined range of duration, 300 ms to 1,100 ms, for example. Because the CPU 40 opens the telephone circuit in S26 in order to completely terminate the communication, the telephone circuit is opened for a period of time longer than 1,100 ms, that is, for a period of time outside the predetermined range of duration (no in S66). Accordingly, the program proceeds to S80, where the exchange system 70 disconnects the line between the facsimile machine 1 and the remote facsimile machine 61. Then, in S82, the exchange system 70 returns the present condition into the original interrupt setting condition so that future communications will be interrupted by other calls incoming from the circuit network.

As described above, according to the present embodiment, the CPU 40 detects in S10 whether the transmission start button 3a has been turned ON to request the automatic facsimile transmission. If so, then the telephone circuit is closed, and a dial tone is transmitted from the exchange system 70. After waiting three seconds after the dial tone has been received, the CPU automatically retrieves in S16 the access code from the RAM 44 and dials the access code. Upon receipt of the dial signal, the exchange system 70 will set the interrupt prohibition condition, in which the present communication will not be interrupted by any other calls incoming from the circuit network. Next in S20, the CPU 40 retrieves the remote facsimile number from the RAM 44, and dials the remote facsimile number. Once the line is connected between the facsimile machine 1 and the remote facsimile machine 61, image information is transmitted from the facsimile machine 1 to the remote facsimile machine 61 in S22.

Thus, before the facsimile machine 1 calls the remote device 61, the access code is automatically retrieved from the RAM 44 and is transmitted to the exchange device 70 so that the communication will not be interrupted by any other calls from the circuit network. The user of the facsimile machine 1 therefore does not need to manually dial the access code. That is, when the user of the facsimile machine 1 wants to automatically transmit a facsimile message to the remote device 61, the user only needs to press the transmission start button 3a after inputting the facsimile number of the remote facsimile machine 61. In response to the user's operation, the facsimile machine 1 automatically transmits to the exchange system 70 the access code for instructing the exchange system 70 to perform the interrupt prohibition setting so that facsimile transmission will not be interrupted by any other calls from the circuit network.

With this configuration, the user does not need to perform any troublesome operation for manually inputting the access code every time the user controls the facsimile machine 1 to automatically transmit facsimile messages. Image information is transmitted only after the interruption is properly prohibited. Accordingly, transmitted image information will not be distorted due to noise which may possibly occur when the image information transmission is interrupted by other incoming calls.

Second Embodiment

Next, a facsimile machine according to a second embodiment of the present invention will be described with reference to FIGS. 4 and 5.

According to the present embodiment, the facsimile machine 1 can automatically request the exchange system 70 to set the interrupt prohibition condition when the user turns ON the transmission start button 3a to perform a facsimile transmission while the user performs a telephone conversation with the remote device 61 using the handset.

The facsimile machine 1 of the present embodiment has substantially the same configuration as the facsimile machine 1 of the first embodiment with the exception that the facsimile machine 1 of the present embodiment executes a manual facsimile transmission routine as shown in FIG. 5. The exchange system 70 of the present embodiment executes the exchange system routine of FIG. 4.

The facsimile machine 1 executes the manual facsimile transmission routine of FIG. 5 while the user of the facsimile machine 1 uses the handset, appended to the facsimile machine 1, to have telephone communication with the remote facsimile machine 61, for example. This telephone communication may be originated at the facsimile machine 1 or at the remote facsimile machine 61. After the user of the facsimile machine 1 tells a user of the remote facsimile machine 61 that he/she will be sending a facsimile message, then the user of the facsimile machine 1 turns ON the transmission start button 3a so that the present facsimile machine 1 be switched into a facsimile transmission mode while the telephone line is being already connected with the remote device 61.

When the CPU 40 detects input of the user's request to switch the facsimile machine 1 into the facsimile transmission mode (S30:YES), then in S32, the user performs a predetermined flash operation for bringing the facsimile machine 1 into a condition capable of requesting setting of the interrupt prohibition condition to the exchange system 70. The user executes the flash operation by putting the hook button, provided to the telephone unit of the facsimile machine 1, in an on hook situation to thereby open the telephone circuit temporarily, that is, for a duration of time within the predetermined range of 300 ms to 1,100 ms in this example. It is noted that as will be described later, the flash operation is detected by the exchange system 70 as a signal for bringing the exchange device 70 into a condition that is capable of setting the interrupt prohibition condition.

Accordingly, the exchange system 70 detects that the circuit is opened for a period of time longer than the predetermined time period (300 ms in this example) (S64:YES). As a result, the exchange system 70 further judges in S66 whether or not a flash input has been received from the facsimile machine 1. In other words, the exchange system 70 judges whether or not the present opening of the telephone circuit is based on the user's executed flashing operation. The exchange system 70 performs this determination by determining whether or not the circuit is open for a period of time within the predetermined range of 300 ms to 1,100 ms. If the opening of the circuit is executed in this range of time, then the exchange system 70 judges that the present opening of the circuit represents a flash input (S66:YES). On the other hand, if opening of the circuit is executed for a duration of time longer than, that is, outside the range of 300 ms to 1,100 ms, then the exchange system 70 judges that the present opening of the circuit is not a flash input (S66:NO).

When the exchange system 70 judges that the present opening indicates a flash input (S66:YES), the exchange system 70 is brought into the condition capable of setting the interrupt prohibition condition. Then, the program proceeds to S68, in which the exchange system 70 judges whether or not there exists any line in a waiting condition. That is, the exchange system 70 judges whether or not there exists any calling party who calls the present facsimile machine 1. If not (S68:NO), then in S70, the exchange system 70 transmits the dial tone to the facsimile machine 1.

In the facsimile machine 1, the CPU 40 waits in S34 for three seconds after removing the dial tone. Then in S36, the CPU 40 retrieves the predetermined access code from the RAM 44, and dials the access code.

When the exchange system 70 detects input of the access code (S72:YES), then in S74, the exchange system 70 transmits, to the facsimile machine 1, a confirmation tone indicating confirmation of the inputted access code. Then in S76, the exchange system 70 sets the interrupt prohibition condition.

In the facsimile machine 1, the CPU 40 waits three seconds in S38 after reception of the confirmation tone. Then in S40, the CPU 40 controls the image scanner 45 to retrieve image information from a document and transmit the image information to the remote facsimile machine 61 over the exchange system 70. Because the interrupt prohibition condition is now being set, while image information is transmitted from the facsimile machine 1 to the remote facsimile machine 61, even when a new calling party calls the facsimile machine 1, the exchange system 70 does not perform any switching operation to connect the line from the new calling party with the line from the facsimile machine 1. The image information transmission will not be interrupted by any incoming calls from the circuit network.

When the CPU 40 detects that transmission of the image information has been completed (S42:YES), then the CPU 40 opens the circuit in S44. Because the CPU 40 opens the circuit longer than 1,100 ms in order to terminate the connection, the switchboard 70 detects that the circuit is opened longer than the predetermined time period (300 ms in this example) (S64:YES). Accordingly, the program proceeds to S66. In S66, the exchange system further judges whether or not the opening of the circuit is due to a flashing operation by judging whether or not the circuit is opened for a period of time within the predetermined range (300 ms to 1,100 ms, in this example). Because the circuit is opened longer than 1,100 ms, the switchboard 70 determines that the circuit is opened for a duration longer than or outside of the predetermined range (300 to 1,100 ms). Accordingly, the exchange system 70 determines that the circuit opening is not due to a flash operation (no in S66). Therefore, the program proceeds to S80, in which the exchange system 70 disconnects the line between the facsimile machine 1 and the remote facsimile machine 61. Then in S82, the exchange system 70 returns the condition to the original interruption setting condition, wherein interruption by any incoming calls from the circuit network will be allowed.

On the other hand, when the exchange system 70 judges that there is some line in a waiting condition (S68:YES), then in S78, the exchange system 70 executes the switching operation to set, to a waiting condition, the line between the facsimile machine 1 and the remote facsimile machine 61, and to set the waiting circuit to a communication condition. In other words, if there is some line in a waiting condition at the time the flashing operation is executed while the facsimile machine 1 performs communication with the facsimile machine 61, the exchange system 70 can interrupt the communicating line by the waiting line so that the new calling party at the waiting line can have a telephone conversation with the user of the present facsimile machine 1 before the facsimile machine 1 starts transmitting image information to the remote device 61.

Thus, according to the present embodiment, if the user of the facsimile machine 1 desires, during his/her communication with the remote device 61, that his/her communication will not be prohibited by interruption by any other calls from the communication network, the user may merely input his/her request to set the communication into the interruption prohibition condition. When the user performs flash operation, a signal indicative of the flash operation is transmitted to the exchange device 70 via the communication circuit that is being presently closed and connected to the remote device 61. The signal sets the exchange device 70 into a condition capable of setting the interrupt prohibition condition. Then, the access code is automatically retrieved from the RAM 44 and transmitted to the exchange device 70. As a result, the exchange device 70 sets the interrupt prohibition condition. The user does not need to manually dial the access code.

Thus, when the user of the facsimile machine 1 manually starts the facsimile transmission while having a telephone conversation with a remote user, then merely by performing the flash operation, the access code for instructing the exchange system 70 to set interrupt prohibition can be automatically sent to the exchange system 70. Therefore, troublesome manual input of the access code can be dispensed with.

While the invention has been described in detail with reference to the specific embodiments therefor, it would be apparent to those skilled in the art that various changes and modifications may be made therein without departing from the spirit of the invention.

For example, according to the above-described embodiments, the facsimile machine 1 requests setting of interrupt prohibition before transmitting image information to the remote device 61. However, the facsimile machine 1 can be designed to request setting of interrupt prohibition before receiving image information from a remote device.

For example, the facsimile machine 1 can be designed into a type that is provided with a function for receiving DTMF (dual tone multi-frequency) signals from a remote source and then starting up a facsimile reception operation to receive image information from the remote source. In this case, after properly executing its remote-controlled starting operation, the facsimile machine 1 can automatically transmit the access code to the exchange system 70 so that the interrupt prohibition condition be set.

Or, the facsimile machine 1 can be configured to automatically transmit the access code to the exchange system 70 to set the interruption prohibition condition after detecting a CNG (calling tone) signal from a remote source while the facsimile machine 1 has a telephone conversation with the remote source.

Further, according to the embodiments described above, the CPU 40, provided to the facsimile machine 1, executes the automatic facsimile transmission routine (interrupt prohibition setting request routine) of FIG. 3 and the manual facsimile transmission routine (interrupt prohibition setting request routine) of FIG. 5. However, the interrupt prohibition setting request routines of FIGS. 3 and 5 can be executed by a CPU 64*a* in the personal computer 64. More specifically, data of a computer program for executing the interrupt prohibition setting request routines of FIGS. 3 and 5 can be stored on a CD-ROM or floppy disk 90. The computer program is read from the CD-ROM or floppy disk 90 by a drive mechanism 64*c* provided to the personal computer 64, and is installed in a hard disk drive 64*b*. The CPU 64*a* executes the computer program thus installed in the hard disk drive 64*b*.

Thus, the communication operation of the present invention may be controlled by the CPU 40 mounted in the facsimile machine 1 or controlled by the computer 64 connected to the facsimile machine 1. A communication device can therefore be realized in both cases when the facsimile machine 1 is mounted with a data storage medium in the form of the ROM 43 and when the computer 64 connected to the facsimile machine 1 is installed with a computer program which is originally stored in the data storage medium such as the floppy disk 90.

The present invention can be applied not only to the facsimile machine but also to other communication devices such as a personal computer provided with a facsimile modem.

In the above-described embodiments, the facsimile machine 1 automatically transmits the access code to the exchange system 70 before starting facsimile transmission operation. However, the facsimile machine 1 may be modified to automatically transmit the access code before starting a telephone communication so that the telephone communication will not be interrupted by any other incoming calls. Similarly, the facsimile machine 1 may be modified to automatically transmit the access code while performing a telephone communication so that the telephone communication will not be interrupted by any other incoming calls any more.

What is claimed is:

1. A communication device comprising:
   communication means for executing communication with a remote communication device via a communication network;
   storing means for storing instruction data for instructing setting of prohibition of interruption from the communication network while communication is being established by the communication means with the remote communication device;
   judging means for determining whether a communication of information other than verbal information is to be conducted; and
   instruction transmission means for, when the judging means determines that the communication of information other than verbal information is to be conducted, automatically retrieving the instruction data from the storing means and for transmitting the instruction data to the communication network before conducting the communication of the information.

2. A communication device as claimed in claim 1, wherein the communication means starts communicating with the remote communication device after the instruction transmission means retrieves the instruction data from the storing means and transmits the instruction data to the communication network.

3. A communication device as claimed in claim 1, wherein the communication means transmits, through a closed communication circuit connected to the remote communication device, a signal for setting a condition capable of setting the interruption prohibition, before the instruction transmission means retrieves the instruction data from the storing means and transmits the instruction data to the communication network.

4. A communication device as claimed in claim 1, wherein the communication means executes communication with the remote communication device via a predetermined exchange device,
   wherein the storing means stores instruction data for instruction the exchange device to set prohibition of interruption by other communications while communication is being established by the communication means with the remote communication device via the predetermined exchange device, and
   wherein the instruction transmission means retrieves the instruction data from the storing means and transmits the instruction data to the predetermined exchange device.

5. A communication device as claimed in claim 4, further comprising input means for enabling a user to input an instruction to start a communication of image information,
   wherein the instruction transmission means, in response to the inputted start instruction, automatically retrieves the instruction data from the storing means and transmits the instruction data to the exchange device before the communication means starts communication with the remote communication device.

6. A communication device as claimed in claim 4, further comprising input means for enabling a user to input an instruction to start communication of image information while a communication is being established with the remote communication device,
   wherein the instruction transmission means, in response to the inputted instruction, automatically retrieves the instruction data from the storing means and transmits the instruction data to the exchange device while the communication means executes communication with the remote communication device.

7. A communication device as claimed in claim 6, wherein the instruction transmission means, in response to the inputted instruction, transmits, to the exchange device via a closed communication circuit connected to the remote communication device, a setting signal for setting a condition capable of setting the interrupt prohibition, before automatically retrieving the instruction data from the storing means and transmitting the instruction data to the exchange device.

8. A communication device as claimed in claim 4, further comprising input means for inputting a request to transmit image information to the remote device,
   wherein the instruction transmission means, in response to the inputted request, automatically retrieves the instruction data from the storing means and transmits the instruction data to the exchange device before the communication means starts transmitting the image information to the remote device.

9. A communication device as claimed in claim 8, wherein the input means enables a user to input a request to transmit image information to the remote device.

10. A communication device as claimed in claim 9, wherein the input means enables the user to input a request to transmit image information to the remote device before the communication means starts communication with the remote device.

11. A communication device as claimed in claim 9, wherein the input means enables the user to input a request to transmit image information to the remote device while the communication means establishes a communication with the remote device.

12. A communication device, comprising:
    a communication unit executing communication with a remote communication device via a communication network;
    a storage unit storing instruction data for instructing setting of prohibition of interruption from the communication network while communication is being established by the communication unit with the remote communication device;
    judging unit for determining whether a communication of information other than verbal information is to be conducted; and an instruction transmission unit, when the judging unit determines that the communication of information other than verbal information is to be conducted, automatically retrieving the instruction data from the storage unit and transmitting the instruction data to the communication network before conducting the communication of the information.

13. A data storage medium storing data of a program for controlling a communication device that has a storing portion for storing therein instruction data for instructing setting of prohibition of interruption from a communication network while communication is being established with a remote communication device, the program comprising:

a program of determining whether a communication of information other than verbal information is to be conducted;

a program of, when conducting the communication of information other than verbal information is determined, automatically retrieving the instruction data from the storing portion and for transmitting the instruction data to a communication network before conducting the communication of the information; and a program of executing the communication with a remote communication device via the communication network.

* * * * *